US012703381B2

(12) United States Patent
Lei et al.

(10) Patent No.: US 12,703,381 B2
(45) Date of Patent: Aug. 11, 2026

(54) MULTIPLE SOURCE MEC ASSISTANCE STRATEGY FOR AUTONOMOUS VEHICLES

(71) Applicant: FORD GLOBAL TECHNOLOGIES, LLC, Dearborn, MI (US)

(72) Inventors: Oliver Lei, Windsor (CA); Somak Datta Gupta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 821 days.

(21) Appl. No.: 17/717,449

(22) Filed: Apr. 11, 2022

(65) Prior Publication Data

US 2023/0322255 A1 Oct. 12, 2023

(51) Int. Cl.
*B60W 60/00* (2020.01)
*G06V 20/58* (2022.01)

(52) U.S. Cl.
CPC ........... *B60W 60/001* (2020.02); *G06V 20/58* (2022.01); *B60W 2420/403* (2013.01); *B60W 2554/4049* (2020.02)

(58) Field of Classification Search
None
See application file for complete search history.

(56) References Cited

U.S. PATENT DOCUMENTS 8,787,987 B2 7/2014 Gullapalli et al.
9,179,488 B2 11/2015 Lei et al.
10,994,748 B2 * 5/2021 Mortazavi ............. B60W 40/04
2020/0186964 A1 6/2020 Lekutai
2021/0024095 A1 * 1/2021 Tao ...................... G05B 19/042
2021/0097783 A1 * 4/2021 Soltani Bozchalooi ..................... G05D 1/0094
2021/0110713 A1 * 4/2021 Silva .................... G08G 1/0175
2022/0357181 A1 * 11/2022 Vitale ................ G01C 21/3848

FOREIGN PATENT DOCUMENTS

CN 107749193 B 12/2020
WO 2021067140 A1 4/2021

* cited by examiner

*Primary Examiner* — James J Lee
*Assistant Examiner* — David Hatch
(74) *Attorney, Agent, or Firm* — Joseph Zane; Brooks Kushman P.C.

(57) ABSTRACT

A system receives scene data from a plurality of multi-access edge computing (MEC) nodes, the scene data for each MEC node indicating data about a scene covered by sensors of a given one of the MEC nodes. The system determines one or more areas of interest included in at least one of the scenes and, for at least one of the one or more areas of interest that includes indicated data from at least two of the MEC nodes, determines whether at least one of the at least two MEC nodes has preferential data. Additionally, the system utilizes the data from the at least two MEC nodes to execute a vehicle maneuver autonomously, in accordance with parameters defined for data utilization that dictate utilization based on the preferential data determination.

20 Claims, 4 Drawing Sheets

Receive Data
201
Compare Areas
203
Use Non-Overlap
205
Overlap ?
207
Y
N
Preferred ?
209
Y
N
Compare to Sensors for Each
211
Use Preferred
213
Sensor Data ?
215
N
Y
Process
217
Compare to Received
219
Error ?
221
N
Y
Report
223
Select Best
225

Receive Request
601
Determine Conditions
603
Compare to Available
605
Preferred ?
607
Y
N
Return Preferred
609
Return Negative
611

Receive Error
501
Analyze
503
Note Issues
505
Compare to Data
507
Classifiable ?
509
N
Y
Report
513
Add Context(s)
511

MULTIPLE SOURCE MEC ASSISTANCE STRATEGY FOR AUTONOMOUS VEHICLES

TECHNICAL FIELD

The illustrative embodiments generally relate to multiple source multi-access edge computing (MEC) assistance strategies for autonomous and other vehicles.

BACKGROUND

Many current vehicles, which may include semi-autonomous and autonomous vehicles, include a plurality of cellular modems using different service providers. This allows for switching strategies when one service is down or one service is weak, although the modems are often designated to generally perform certain functions (e.g., one for data upload and download, one for telematics services, etc.). While a given modem may have a common designated task, it can also be used for alternative purposes, and with a plurality of providers, access provisions for each provider (e.g., subscription information) may be available in a given vehicle.

As vehicle autonomy becomes more sophisticated, integration of infrastructure cameras may be useful in assisting the vehicle in "seeing" an intersection. That is, a plurality of providers may provide infrastructure MEC cameras at any particular intersection. These will often involve different cameras with different viewpoints and differing capabilities. Views may overlap, but because of camera feature and deployment locations, each camera may also have exclusive views of certain areas or perspectives. Further, due to both technology utilized and camera placement, environmental events may also have differing impacts on viewpoints (e.g., westward driving rain may impede the view of one camera, but another may be sheltered in the lee of a building.

While the camera feeds may provide useful information to both human and autonomous drivers, the autonomous driving computers need to make decisions based on a confidence level of data. That is, a human can determine what is shown and how useful the information may be, but a computer may have to make an educated guess about certain data. Even a human may struggle with a blurry or indeterminate image, and a computer may have a very low confidence that, for example, a streaky black shape is an approaching vehicle. Since the ultimate result of the vehicle determination is a driving action, vehicles may be programmed to act or react based on a certain confidence level associated with incoming data and determinations of actions based on that data.

SUMMARY

In a first illustrative embodiment, a system includes one or more processors of a vehicle configured to receive scene data from a plurality of multi-access edge computing (MEC) nodes, the scene data for each MEC node indicating data about a scene covered by sensors of a given one of the MEC nodes. The one or more processors are also configured to determine one or more areas of interest included in at least one of the scenes and, for at least one of the one or more areas of interest that includes indicated data from at least two of the MEC nodes, determine whether at least one of the at least two MEC nodes has preferential data. Additionally, the one or more processors are configured to utilize the data from the at least two MEC nodes to execute a vehicle maneuver autonomously, in accordance with parameters defined for data utilization that dictate utilization based on the preferential data determination.

In a second illustrative embodiment, a method includes receiving scene data from a plurality of multi-access edge computing (MEC) nodes, the scene data for each MEC node indicating data about a scene covered by sensors of a given one of the MEC nodes. The method also includes determining one or more areas of interest included in at least one of the scenes and, for at least one of the one or more areas of interest that includes indicated data from at least two of the MEC nodes, determining whether at least one of the at least two MEC nodes has preferential data. Further, the method includes utilizing the data from the at least two MEC nodes to execute a vehicle maneuver autonomously, in accordance with parameters defined for data utilization that dictate utilization based on the preferential data determination. The method also includes determining any errors in the received data based on sensor data received from one or more sensors of the vehicle during execution of the vehicle maneuver, based on comparison of elements of the received data to scene data indicated by the one or more sensors and reporting, to a remote server, any identified errors.

In a third illustrative embodiment, a non-transitory computer-readable storage medium stores instructions that, when executed, cause one or more executing processors of a vehicle to perform a method including receiving scene data from a plurality of multi-access edge computing (MEC) nodes, the scene data for each MEC node indicating data about a scene covered by sensors of a given one of the MEC nodes. The method also includes determining one or more areas of interest included in at least one of the scenes and, for at least one of the one or more areas of interest that includes indicated data from at least two of the MEC nodes, determining whether at least one of the at least two MEC nodes has preferential data. Further, the method includes utilizing the data from the at least two MEC nodes to execute a vehicle maneuver autonomously, in accordance with parameters defined for data utilization that dictate utilization based on the preferential data determination.

DETAILED DESCRIPTION

Figure 1:
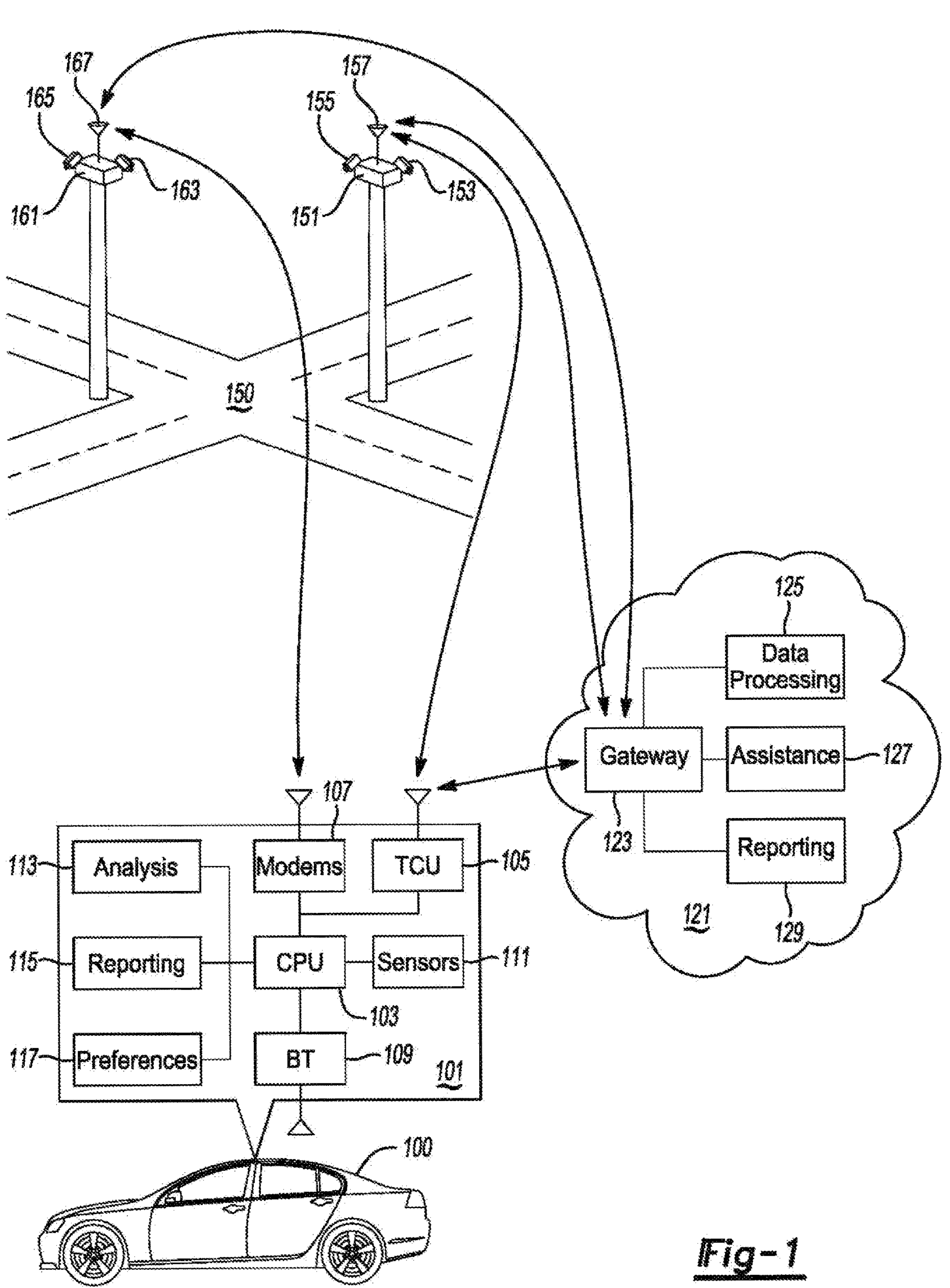
FIG. 1 shows an illustrative example of a multi-MEC system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments, and the like, recognize that multiple MEC nodes, provided by different providers, may be present at any intersection. At any given intersection, it is possible that a certain provider or MEC node has better vision, better coverage, etc., or at least under certain conditions and/or when approaching the intersection from a certain direction and/or making a certain maneuver. For example, camera 1 may have a mediocre view of a northbound street leaving the intersection, especially under inclement weather. Camera 2 may provide a better view with more information, and be better sheltered from weather. At the same time, camera 1 may have a better view of southbound and eastbound streets leaving the intersection, and so which data is most useful may be a function of an intended vehicular action.

Accordingly, as thousands of vehicles use and rely on camera data from a given intersection, the appropriateness of a given camera for a given maneuver may become readily apparent. Further, certain providers may source cameras or have deployment strategies that tend to be less useful, so even if an intersection is newly established or has newly established MEC cameras about which historical data is unavailable, a vehicle may be able to project which data is more likely to be useful.

Also, certain MECs may have additional features (infrared, number of cameras, thermal cameras, angles of view, types of lenses, etc.) and/or rely on different algorithms for detection and identification of objects. Vehicles and/or cloud services can analyze the quality of results (the analysis being both live and/or post-facto) to determine a preferred data set (which could include all data) for a given maneuver and to determine historical usefulness data usable to model camera performance.

MECs may also broadcast coverages and limitations, to assist a vehicle in determining which MEC results to use. This can include, for example, latitude longitude coverages, blocked view areas, weather interference, etc. An MEC node may engage in self-analysis and/or receive feedback from other vehicles to determine a present state of coverage, as well as have general information about coverage based on deployment and included equipment.

FIG. 1 shows an illustrative example of a multi-MEC system. This system includes a vehicle 100 which may be a human-driven or autonomous vehicle. Illustrative examples will be provided herein with regards to autonomous vehicle usage, but it is appreciated that information used by an autonomous vehicle can also be used by a human driver, at least in certain instances.

The vehicle 100 includes an onboard computing system 101 with one or more processors 103, and a plurality of modems 107, at least one of which functions in conjunction with a telematics control unit 105 (TCU). The vehicle may also have a BLUETOOTH transceiver 109 and/or other wireless transceivers (e.g., Wi-Fi) for local data transmission.

In this example, the vehicle has an analysis process 113, a reporting process 115 and a preferences selection process 117. The analysis process may weight and analyze information or possible information sources for a given intersection. The reporting function may provide feedback to the cloud 121 and/or various MEC nodes 151, 161, from which data is received. The preferences process 117 may include local categorization and storage of prior results analysis, so that the vehicle 100 may be able to quickly determine which data to use when approaching an intersection it frequents, or has traveled through at least one before.

The cloud 121 includes a gateway 123 for handling communication requests to and from various sources. The cloud 121 may also have a data process/analysis process 125, which can assist vehicles 100 in determining suitable data and can generally perform post-fact analysis on reported data, which may also include vehicle sensor 111 data that can help determine if data from an MEC node 151, 161, was accurate or not. An assistance process 127 can help vehicles 100 in route planning, which can include recommending certain MEC nodes 151, 161, for a given intersection based on functional characteristics, planned maneuvers, inclement weather, etc. A reporting process can report malfunctioning or low confidence results to service providers for the MEC nodes, which may result in relocation of a node, upgrade of equipment or general improvement of node functionality.

FIG. 1 also shows an illustrative intersection 150 with two nodes 151, 161. Each node in this example includes cameras 153, 155, 163, 165 and wireless transception capability 157, 167. The cameras cover different viewpoints and different angles, and may also comprise different equipment. The nodes may also include various other visual/audible sensors, radar, lidar, etc. While not shown, for the sake of keeping the figure clean, the intersection presumably often includes lights, buildings, trees, signs, etc., which may impact the visual field of one or more cameras, and which may also create benefits (shelter), mounting points and or impediments to various viewpoints and node coverage.

Figure 2:
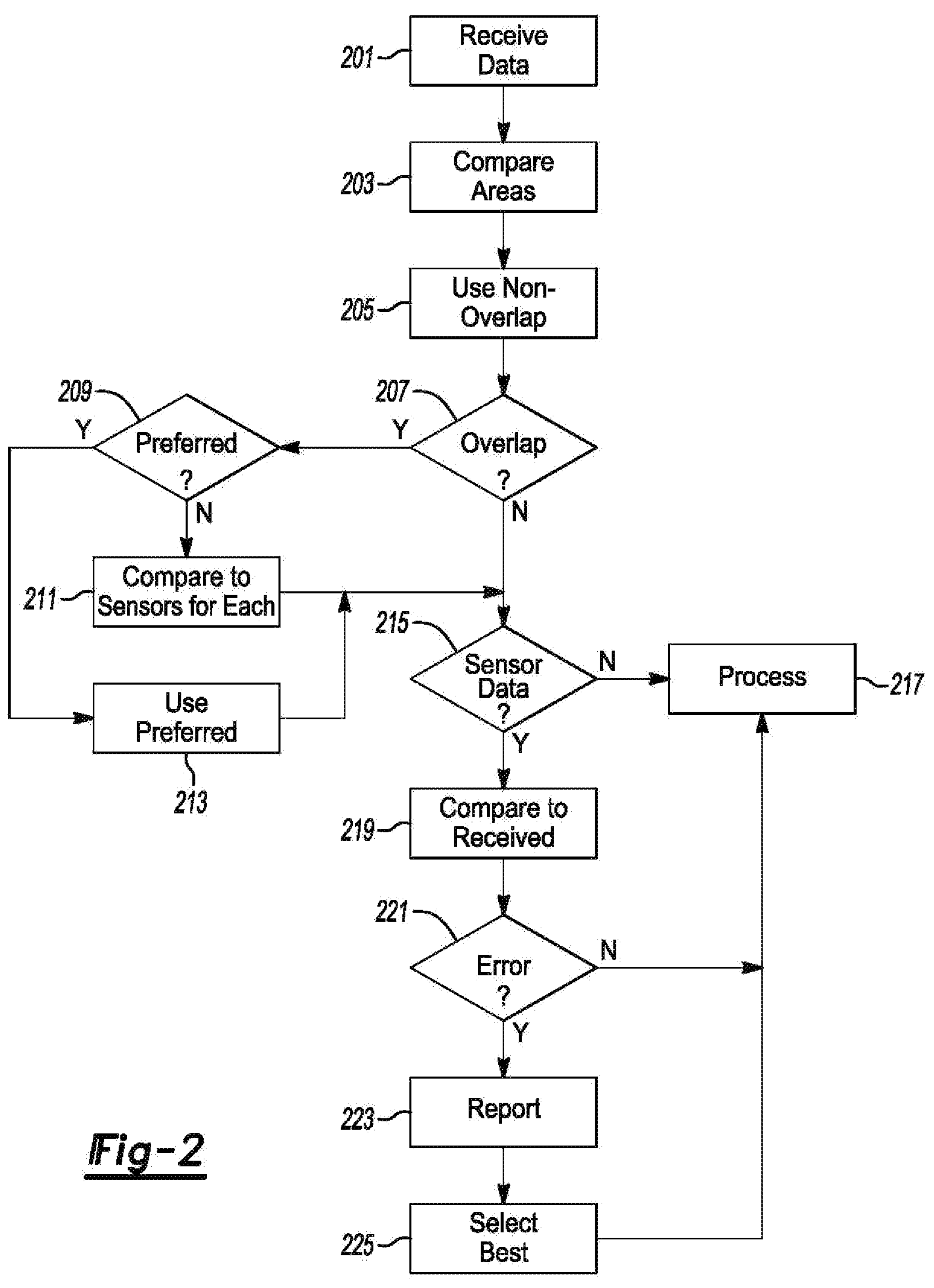
FIG. 2 shows an illustrative example of an analysis process.

FIG. 2 shows an illustrative example of an analysis process. In this example an analysis process or data handling process, for example, receives feed and gathered data from a plurality of MEC nodes at 201. Since each data set may cover different areas, including some non-overlapping areas, the process compares the areas at 203 to determine discrete (to one MEC node) areas of coverage. The non-overlapping areas are used (when desired or needed), since they are the single source of data (in this example) for coverage of those areas—that is, the other MEC nodes in this example do not have any data insights or coverage of the non-overlapping areas for alternative MEC nodes. The vehicle 100 may request certain node data covering certain areas of interest, such as those occupying space where a vehicle maneuver will cause the vehicle to travel. Further, additional buffer areas that may contain relevant data (pedestrians, other vehicles with intersecting paths, etc.) may also be requested, identified and/or received.

If there are areas of interest that do overlap at 207, the process checks at 209 if a specific node has been designated as a preferred node (e.g. based on historical analysis and/or current context, such as, but not limited to, planned maneuvers, heading, weather, etc.). Preferred node designation can be based on data stored in the vehicle 100 or data obtained from the cloud, either in real-time or in advance of an intersection (e.g., as part of a route plan or when approaching an intersection). If there is a preferred node at 209, that node data may be used or weighted more heavily at 213. Even if there is a preferred node, data from other nodes may be collected for lower weighting or post-facto analysis. If there is no preferred node, an analysis (AV judgment process) may receive results and compare confidence levels for each result. The process may also, additionally or alternatively, compare the results to data from vehicle or other available sensors at 211, if available and covering any portion of the area of interest.

If there is no relevant vehicle sensor data at 215, the process may simply use the chosen node data and/or use weighted versions of the node data. Otherwise, the process may compare the received results to vehicle sensor data at 219 and identify any seeming errors in the reported data at 221. In the absence of errors, the sensor data is combined with the node data and processes, otherwise any determined errors can be reported at 223 and then the best version (e.g., above a certain confidence level) of the node data can be selected at 225 and combined with the sensor data for processing at 217.

For example, without limitation—an analysis process (AV Judge process) receives input from two MEC nodes and vehicle sensors including camera, LiDAR, radar. Upon receiving the results from the nodes (servers), if the results difference is within a threshold (e.g., pedestrian detection with 90 and 85 percent confidence), and location differences are within a threshold proximity (e.g., 5 meters), the AV judge can use the average location of both results as a combined result, and/or weight the result towards a certain data set based on confidence levels of each. Weighting can have a direct correlation to confidence levels (0.9 weight for data A, 0.85 weight for data B, in the preceding example) or it may be used to delineate weighting in other appropriate manners.

On the other hand, if the confidence levels or locations are outside the thresholds (e.g., 90 vs 70 percent confidence and 10 meter location difference) the AV judge may simply use the higher confidence result and discard the low confidence result. Context variables (e.g., without limitation, time of day, heading, weather, temperature, type of object, confidence level, etc.) may also be reported with reporting for the low and high confidence data. These variables can eventually draw correlations as to what data is best obtained from which MEC nodes—e.g., one node may be better at person-detection, another may be better at identifying objects moving at over 25 mph. Similarly, a lack of detection of an object can be reported—where an MEC node does not detect an object that it should have detected.

Node data can be combined with vehicle sensor data, and eventually errors in each node can be classified by the server—e.g. errors during certain times of day, under a specific weather condition, under any weather condition other than clear skies, only at a specific node/server, perpetual low confidence results, never reporting certain object detection at certain locations or for objects of a certain type, etc. This can assist in tuning the MEC nodes and also help vehicles 100 know which data to utilize. As noted above, each node may have differently useful data, and so the vehicle 100 could use data from both nodes with respect to different factors, if each node was better than the other(s) at identifying the used type of data under the current context.

Figures 3, 4:
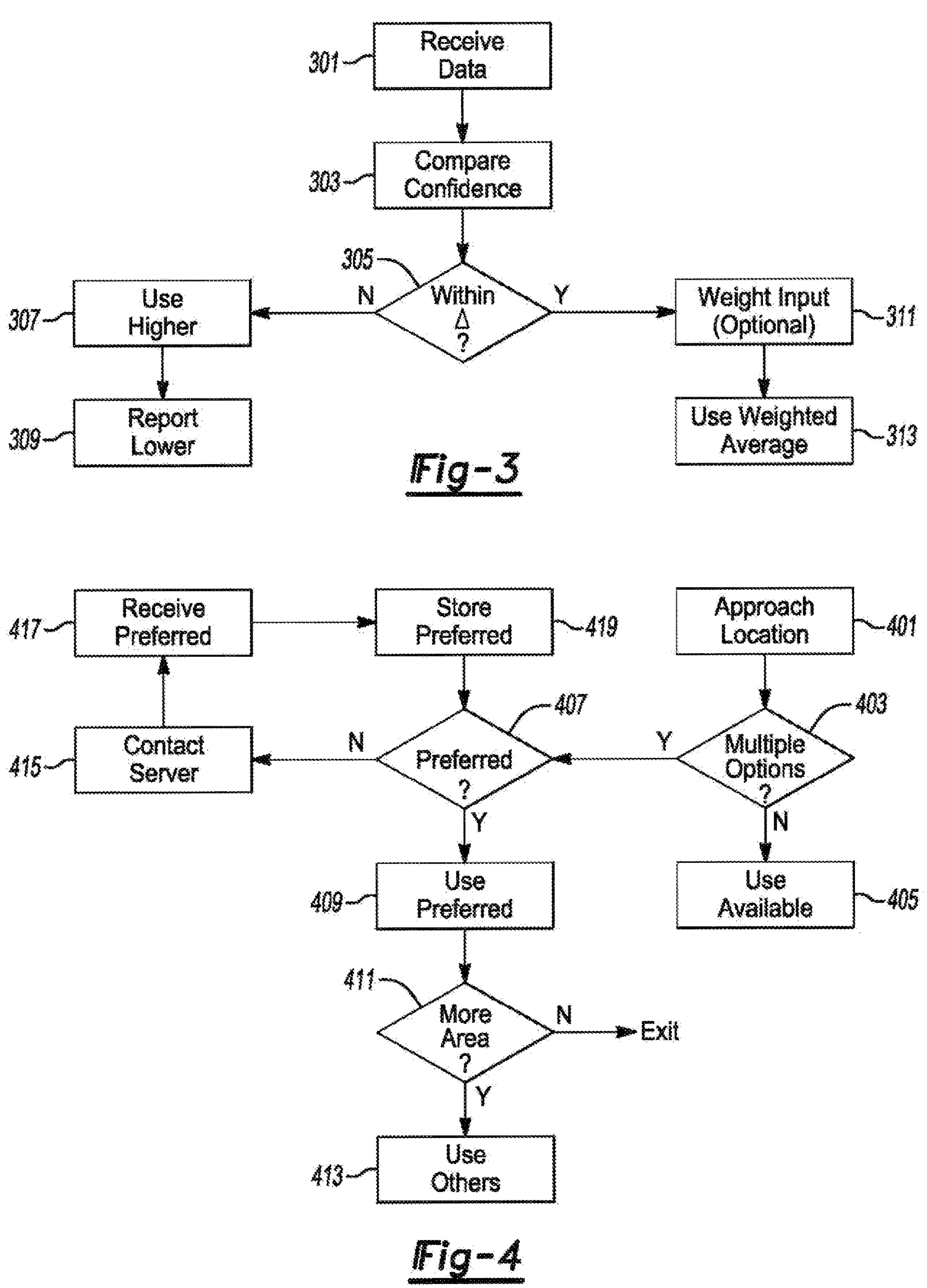
FIG. 3 shows an illustrative example of a results choice process.
FIG. 4 shows an illustrative example of a preconditioning process.

FIG. 3 shows an illustrative example of a results choice process. As previously discussed, this can include receipt of data from a plurality of MEC nodes at 301. The data may have overall confidence, or elements of the data may have individual confidences (e.g., vehicle with 80% confidence, pedestrian with 95% confidence, parcel in road with 30% confidence). For all data identifying a usable instance, the confidence levels are compared at 303 and if the confidences are within a threshold delta at 305, the process may either weight the data at 311 or simply average the data without weighting. The weighted or non-weighted average can then be used at 313.

If the confidences are outside the threshold, the process uses the higher (or several higher) confidences at 307 and reports the lower data as erroneous for various reasons as previously discussed. Again, in this example, the multiple carrier modems onboard the vehicle 100 make it practical to receive the data from MEC nodes maintained by different carriers, although this process could also be used to analyze multiple differently located MEC nodes around a same intersection provided by the same carrier.

FIG. 4 shows an illustrative example of a preconditioning process. This process can be used to determine which data should be used in advance of an intersection, or in real-time when data is received. As the vehicle approaches a location at 401 (or when a route is planned, for example), the process may determine that there are multiple MEC nodes with accessible data at 403. If there are not such nodes at 403, the process may simply use available data at 405. The presence of nodes can be determined based on known node geographic locations, received signals, etc.

If there are such nodes at 403, the process determines if the vehicle 100 is already storing a preferred node at 407. Since a given node may be more or less useful based on context, the preferred node data may also include preferred contexts, and a preferred node may not be selected as preferred unless a certain amount of the context is met as well.

If there is no clearly preferred node that is better under context than any other nodes, the process may contact the server at 415 to determine which of the nodes should be used, as there is more than one node available in this example. The server, which may have a much larger data set and can lookup relevant context based on received maneuver information as well as present external condition information, can respond with a preferential node (if any), which is received at 417 and stored at 419 along with any relevant context indicators for usage under similar context in the future.

At that point, or if the vehicle 100 already had a preferred node at 407, the vehicle 100 uses or heavily weights the preferred node at 409. If there are areas of interest outside the coverage of the preferred node at 411, the process may also use data from nodes covering those areas at 413, even if those are not the preferred nodes. This may be done because those may be the only possible sources of data. All received data that can be cross checked with vehicle sensors may be determined for error and all received data and confidence indicators may be logged onboard and reported to the server for historical analysis to continually update the performance of various MEC nodes.

Figures 5, 6:
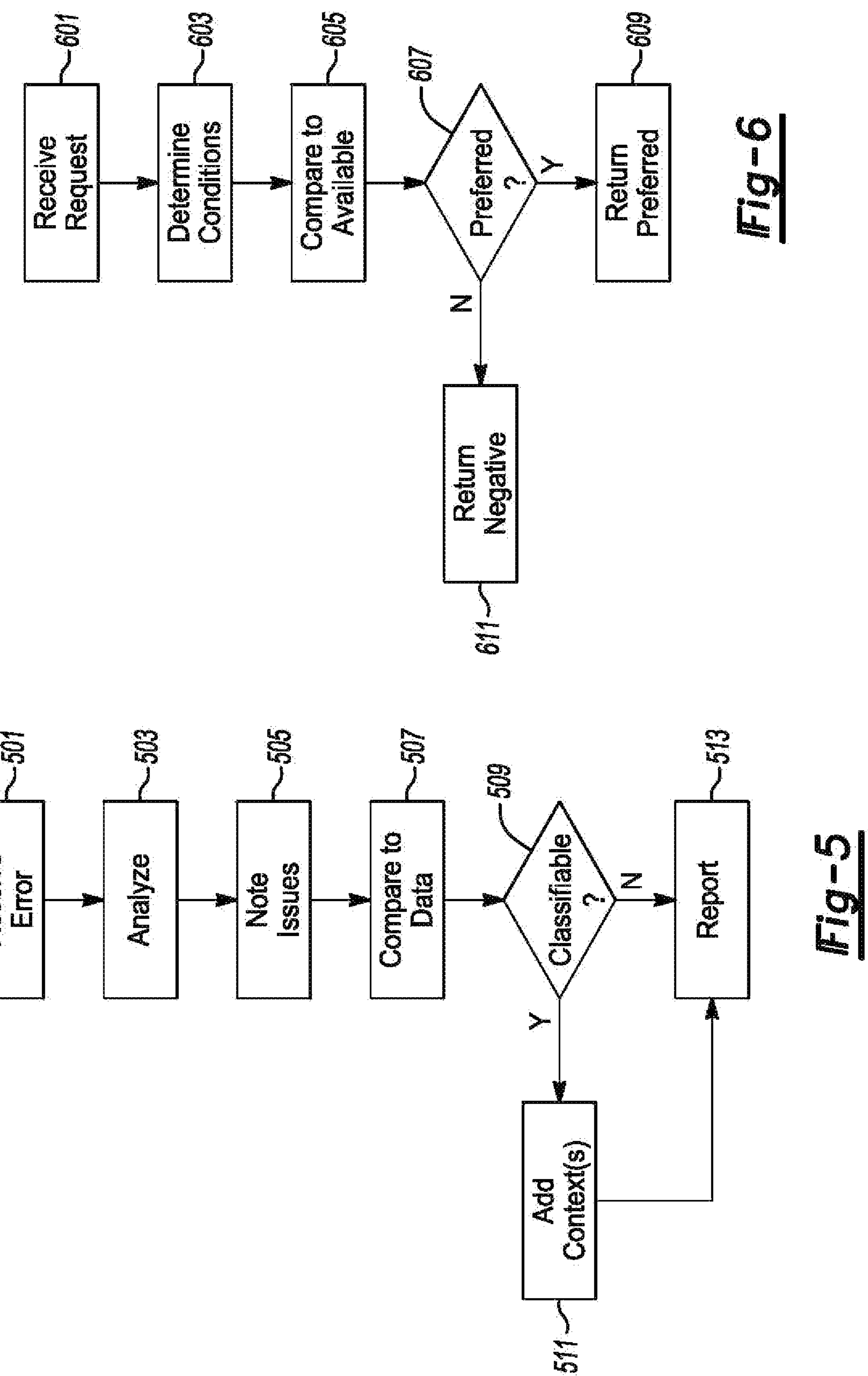
FIG. 5 shows an illustrative example of error reporting.
FIG. 6 shows an illustrative MEC recommendation process.

FIG. 5 shows an illustrative example of error reporting. In this example, the process (e.g., executing in the cloud) receives an indication of error from a vehicle 100. For example, the data may indicate that an object is at a certain position, and the vehicle sensors (which may be more accurate) may instead register the object at a different location. Similarly, the lack of an object in the data (that is subsequently detected by the vehicle) and/or the presence of an object (that is subsequently not detected) may also be registered. Artifacts (precipitation, dirt, glare, tree branches, a large vehicle like a semi truck, etc.) that may affect the view of a camera or other node sensor may not have as much effect on a vehicle sensor, because the vehicle sensor may be higher quality and/or closer to the scene.

The presence of these errors can cause issues if the vehicle 100 is partially relying on the data. The process can analyze the error for type and likely causes, which can include analyzing contextual data at the time of data gathering (e.g., a weather report for the location and/or vehicle data indicating the presence of weather). Vehicle data may also, for example, indicate the presence of a large truck, which can then be used to extrapolate the presence of the truck as an obstruction preventing the identification of an object that is behind the truck from the perspective of the node.

Issues that are present, temporary, rectifiable, context-related, etc. can be determined from the analysis and noted at 505. This can include comparing the data at 507 to other data received from the same node, to determine if an issue is ongoing or temporary. For example, dirt on a camera lens or consistent misidentification of objects in rain or glare may be a persistent issue, but the presence of a large truck blocking a field of view may be temporary. At the same time, if large trucks frequent the area and consistently block necessary viewpoints, the node-provider may want to change the location of the node to account for this.

The process can classify the issues (e.g., without limitation, temporary, persistent, etc.) at 509 and may add in any relevant context at 511 that seems to be present both in the present instance and any context that seems to persist when the given error is identified. Some instances may not be classifiable (e.g, a bird perched in front of a camera may simply appear as a white blur due to proximity and lensing), and so may simply be identified for use by the provider if this creates a persistent issue. All relevant data can then be reported at 513 to the given node provider, as well as stored locally (in the cloud or vehicle, for example), for use in later evaluations, such as when a given MEC node may be more or less useful than other possible nodes.

FIG. 6 shows an illustrative MEC recommendation process. This is a process that also can be executed in the vehicle 100 or in the cloud, and can provide a recommendation about which node(s) to use when approaching an intersection. This can be provided upon approach, in real-time, or well in advance (e.g., miles out, during route planning, etc.). Context may change over time, so the recommendation can also be provided with relevant context (e.g., use CellCo1 Node if raining, else either node is fine) so that the vehicle 100 can determine which data to use when the intersection is actually reached.

The process receives a request at 601, that can identify the location(s) of interest. The process can look at present or projected (based on weather reports, historical data, etc.) context at the time the vehicle is, or will likely be, at the point of interest, at 603. This data can be compared to available nodes at the point/location of interest at 605, which may also take into account any planned vehicle maneuver.

For example, if a vehicle is moving straight through the intersection, either node may be fine, regardless of context. But if the vehicle is turning north, for example, in the afternoon, westerly originating sunlight may partially blind one node that has west-facing cameras, and so the data from the other node may be preferable at 607. At the same time, some coverage of the area of interest (north of the intersection) may only be available from the other, partially blinded node, and so this can be indicated in the recommendation as well. If there is a preferred node or sequence of nodes or preferred node for a given coverage are, for example, at 607, this can be indicated to the vehicle 100 processor at 609. Otherwise, the vehicle 100 may be instructed to use any available data.

Even if a preferred node is not indicated, this does not mean the vehicle will automatically use all data from all nodes. Confidence scores can still affect vehicle usage of the data as discussed. Similarly, even if a preferred node is indicated, the vehicle 100 may still receive data from all nodes and consider confidence scores, because the less preferred node may have been improved since historical data was gathered, but new improvements may not be discernable if there is a long track record of bad performance under certain contexts. On the other hand, if the vehicle 100 receives data from both nodes indicating a confidence score of 75% (which, under other circumstances, might cause the vehicle 100 to use both sets), the preference recommendation may cause use of a single node's data, because there may be a track record of errors with the other node, regardless of confidence data, under any current applicable context.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:

one or more processors of a vehicle configured to:

receive scene data from a plurality of multi-access edge computing (MEC) nodes, the scene data for each MEC node indicating data about a scene covered by sensors of a given one of the MEC nodes;

determine one or more areas of interest included in at least one of the scenes;

for at least one of the one or more areas of interest that includes indicated data from at least two of the MEC nodes, determine whether at least one of the at least two MEC nodes has preferential data; and utilize the data from the at least two MEC nodes to execute a vehicle maneuver autonomously, in accordance with parameters defined for data utilization that dictate utilization based on the preferential data determination.

2. The system of claim 1, wherein receipt of the scene data is responsive to a request sent to each MEC node from which data is received, the request indicating the one or more areas of interest.

3. The system of claim 2, wherein the scene data from each MEC node received responsive to the request is directed to any portions of the one or more areas of interest contained within the scene covered by the sensors of the given responding MEC node.

4. The system of claim 1, wherein the one or more areas of interest are determined based at least in part on a planned maneuver of the vehicle to cover areas that will be traversed by the vehicle as part of the planned maneuver.

5. The system of claim 4, wherein the one or more areas of interest further include additional regions predetermined as relevant regions to the planned maneuver.

6. The system of claim 1, wherein the preferential data determination includes analyzing a confidence score associated with the data from each of the at least two MEC nodes.

7. The system of claim 6, wherein the confidence score is associated with individual aspects of the data from each of the at least two MEC nodes.

8. The system of claim 6, wherein the parameters dictate usage of data from any of the at least two MEC nodes that have confidence scores within a predetermined differential of each other.

9. The system of claim 6, wherein the parameters dictate disregard of data from any of the at least two MEC nodes that have confidence scores outside a predetermined differential of confidence scores associated with comparable data from other of the at least two MEC nodes.

10. The system of claim 6, wherein the parameters dictate a weighting strategy for utilized data that weights the data for usage based at least in part on the confidence scores of respective data.

11. The system of claim 1, wherein the preferential data determination includes evaluating the data under any current context compared to historical data gathered under comparable context to identify possible errors resulting from the current context.

12. The system of claim 1, wherein the preferential data determination includes a request, from a remote server, of identification of one or more MEC nodes of the plurality of MEC nodes whose data should be used.

13. The system of claim 12, wherein the request for identification includes the vehicle maneuver.

14. The system of claim 12, wherein the request for identification is sent by at least one of the processors when the vehicle is within a predefined proximity to a location associated with at least one of the MEC nodes.

15. The system of claim 12, wherein the request for identification is sent by at least one of the processors when the vehicle is generating a route plan.

16. The system of claim 12, wherein a response to the request includes identification of one or more preferred MEC nodes of the plurality of MEC nodes.

17. The system of claim 16, wherein the response includes identification of at least one aspect of context utilized in a determination of the one or more preferred MEC nodes.

18. The system of claim 17, wherein at least one of the one or more processors is further configured to determine whether the aspect of context has changed, when the vehicle is within a predefined proximity to a location associated with at least one of the MEC nodes, and, responsive to a change in the context, send a new request for identification.

19. A method comprising:

receiving scene data from a plurality of multi-access edge computing (MEC) nodes, the scene data for each MEC node indicating data about a scene covered by sensors of a given one of the MEC nodes;

determining one or more areas of interest included in at least one of the scenes;

for at least one of the one or more areas of interest that includes indicated data from at least two of the MEC nodes, determining whether at least one of the at least two MEC nodes has preferential data;

utilizing the data from the at least two MEC nodes to execute a vehicle maneuver autonomously, in accordance with parameters defined for data utilization that dictate utilization based on the preferential data determination;

determining any errors in the received data based on sensor data received from one or more sensors of the vehicle during execution of the vehicle maneuver, based on comparison of elements of the received data to scene data indicated by the one or more sensors; and reporting, to a remote server, any identified errors.

20. A non-transitory computer-readable storage medium storing instructions that, when executed, cause one or more executing processors of a vehicle to perform a method comprising:

receiving scene data from a plurality of multi-access edge computing (MEC) nodes, the scene data for each MEC node indicating data about a scene covered by sensors of a given one of the MEC nodes;

determining one or more areas of interest included in at least one of the scenes;

for at least one of the one or more areas of interest that includes indicated data from at least two of the MEC nodes, determining whether at least one of the at least two MEC nodes has preferential data; and utilizing the data from the at least two MEC nodes to execute a vehicle maneuver autonomously, in accordance with parameters defined for data utilization that dictate utilization based on the preferential data determination.

* * * * *